(12) United States Patent
Jager

(10) Patent No.: US 6,378,893 B1
(45) Date of Patent: Apr. 30, 2002

(54) EXTENDABLE TRAILER

(76) Inventor: Willem Jager, R.R. #2, Breslaw, Ontario (CA), N0B 1M0

( * ) Notice: Subject to any disclaimer, the term of this patent is extended or adjusted under 35 U.S.C. 154(b) by 0 days.

(21) Appl. No.: 09/692,482

(22) Filed: Oct. 20, 2000

(51) Int. Cl.[7] .............................................. B62D 63/08
(52) U.S. Cl. ........................ 280/656; 280/401; 296/50
(58) Field of Search ............................ 280/47.18, 401, 280/414.2, 416, 491.1, 652, 656; 296/50, 51, 52, 53, 57.1, 106, 181; D12/101

(56) References Cited

U.S. PATENT DOCUMENTS

| 418,451 | A | | 1/1889 | Konecheck | ................ D12/101 |
|---|---|---|---|---|---|
| 2,569,965 | A | | 10/1951 | Wiedman | .................... 296/28 |
| 3,612,600 | A | * | 10/1971 | Salichs | ........................ 296/52 |
| 4,126,324 | A | * | 11/1978 | Browning | .................. 280/656 |
| 4,362,316 | A | | 12/1982 | Wright | ....................... 280/656 |
| 4,767,150 | A | * | 8/1988 | Hall | ............................ 296/52 |
| 4,772,038 | A | | 9/1988 | MacDonald | ................ 280/401 |
| 5,340,134 | A | * | 8/1994 | Dodson | ...................... 280/656 |
| 5,480,180 | A | | 1/1996 | Fuller et al. | ................ 280/656 |
| 5,544,944 | A | | 8/1996 | Keech | ............................ 298/5 |
| 5,711,569 | A | * | 1/1998 | Sovoda | ..................... 296/57.1 |
| 5,857,825 | A | | 1/1999 | Rice | ........................... 414/483 |

* cited by examiner

*Primary Examiner*—J. J. Swann
*Assistant Examiner*—Christopher Bottorff
(74) *Attorney, Agent, or Firm*—Riches, McKenzie & Herbert LLP

(57) ABSTRACT

A manually removable tailgate for a trailer which is to be coupled to the trailer either in a wall-forming configuration or a bed extending configuration. The tailgate is coupled to the trailer bed by a plug-in-socket sliding arrangement with, upon removal, relative rotation of the plug and/or the entire gate 180 degrees about an axis of the socket permitting movement from one orientation to the other.

19 Claims, 8 Drawing Sheets

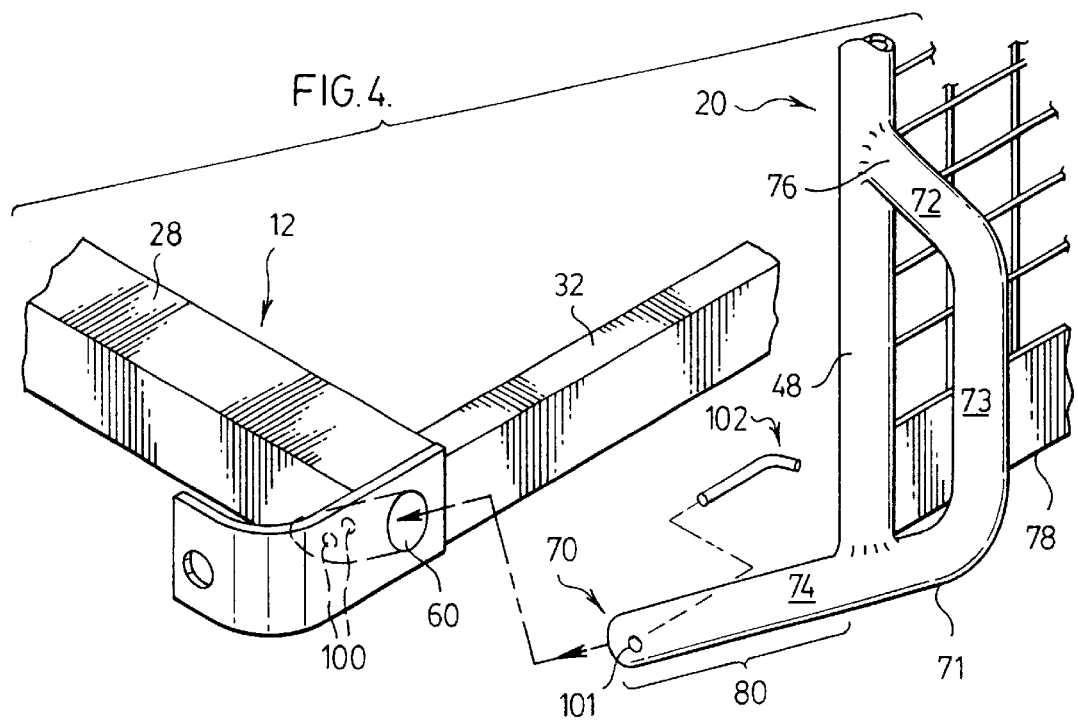
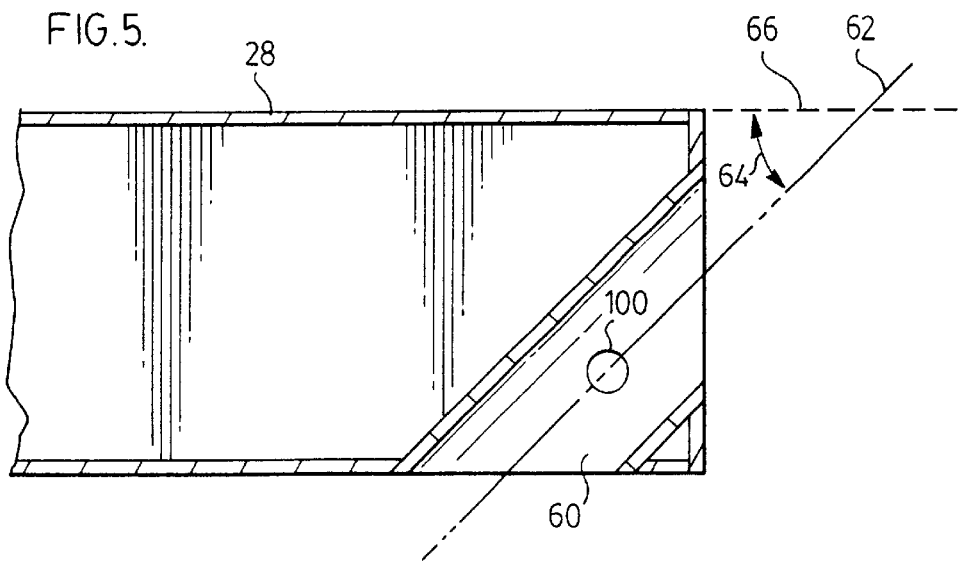

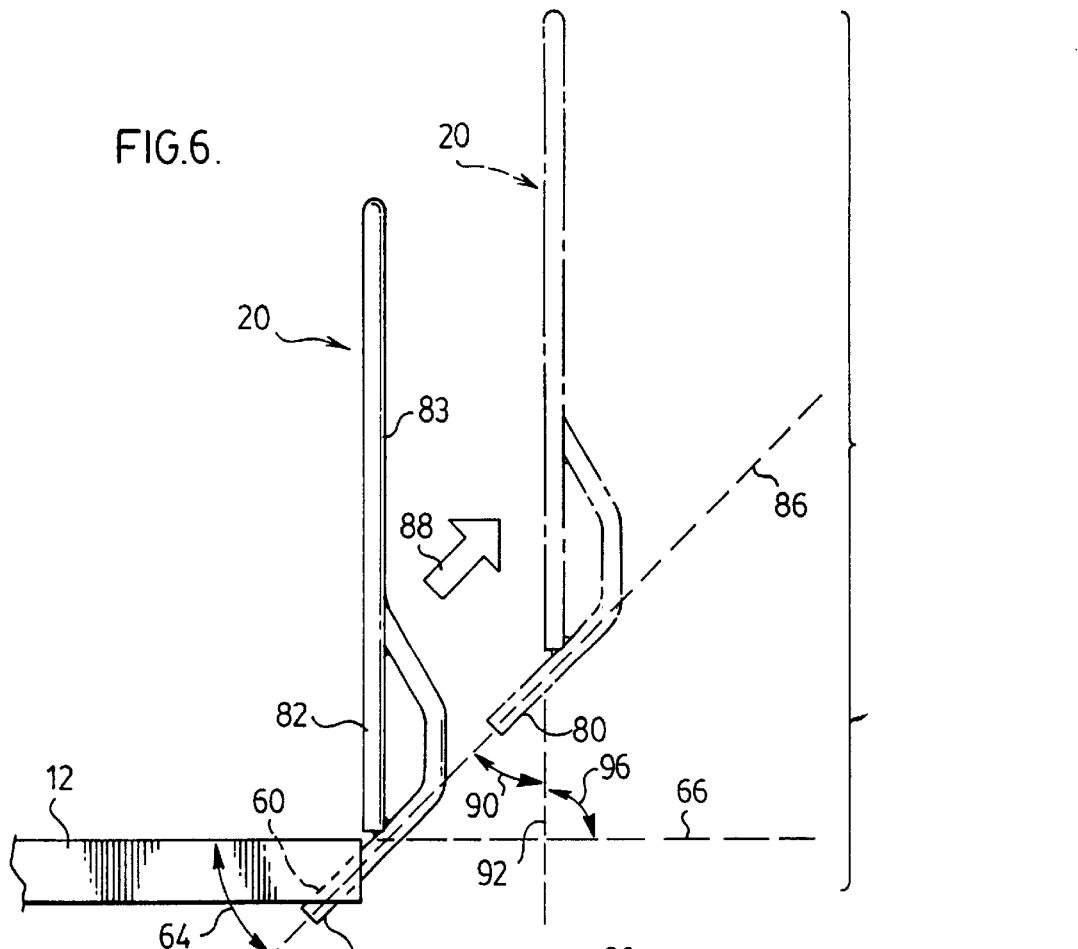
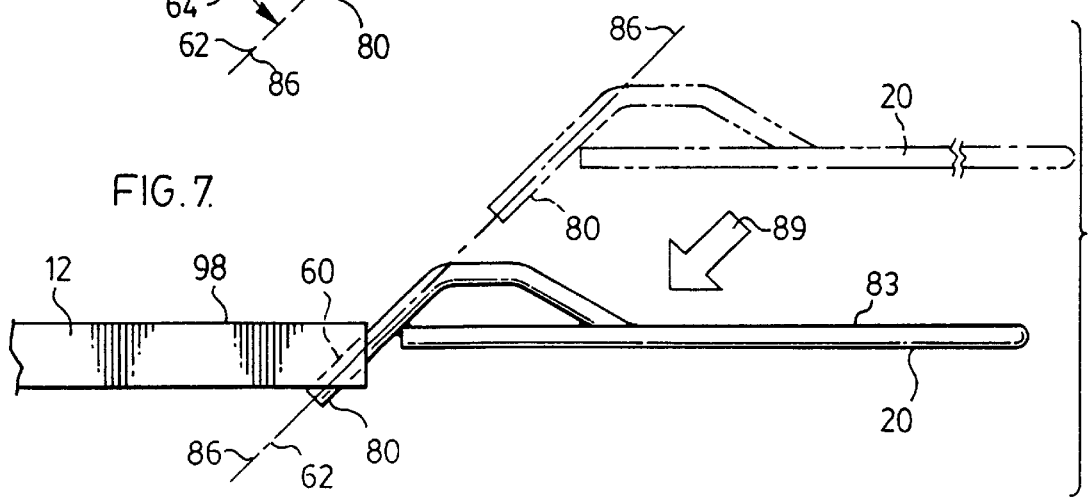

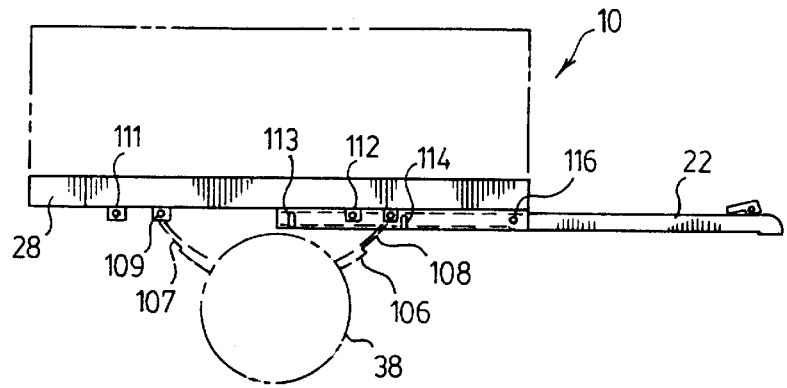
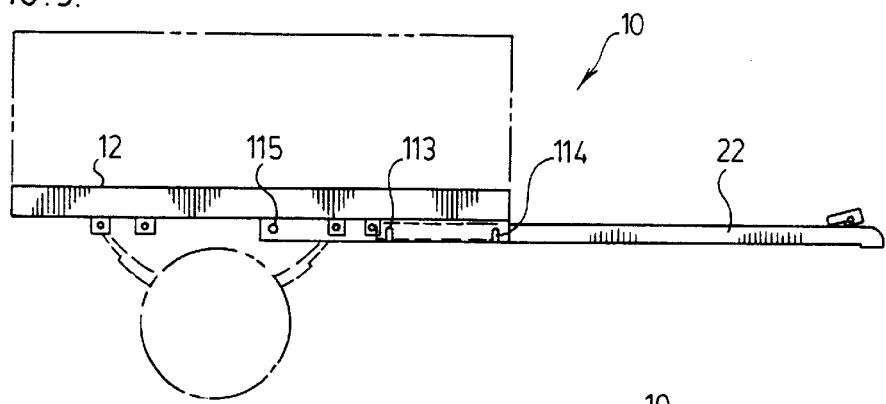
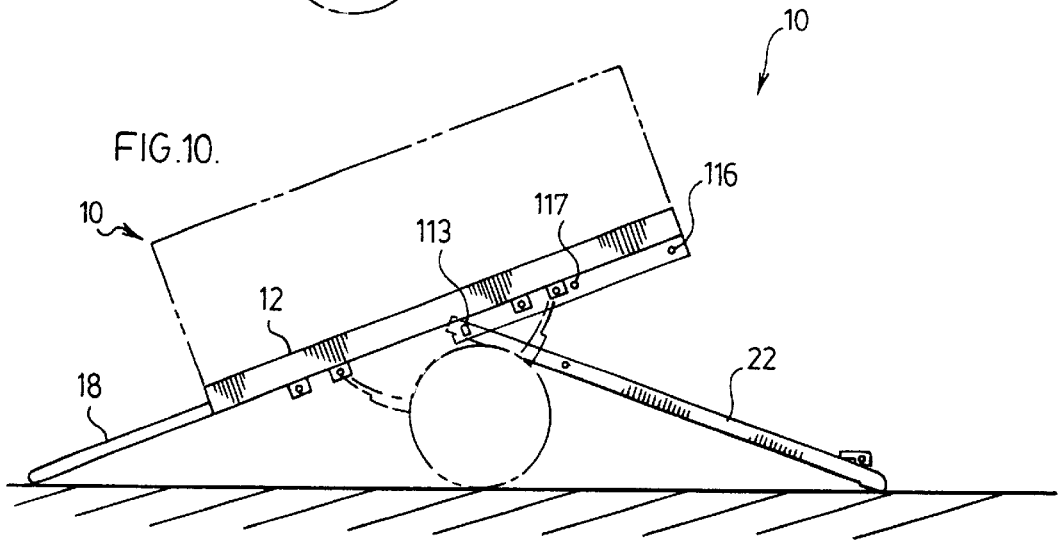

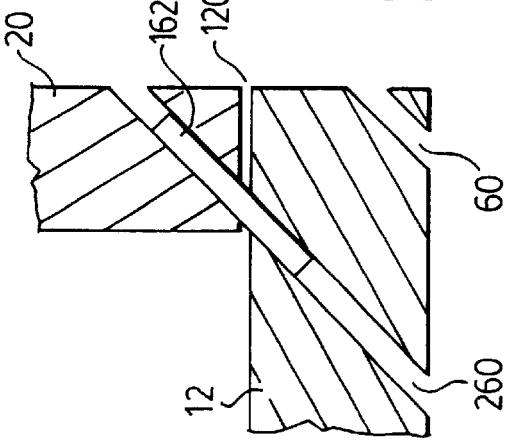
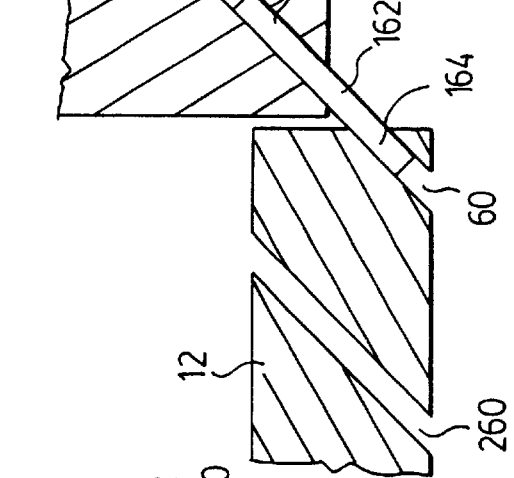
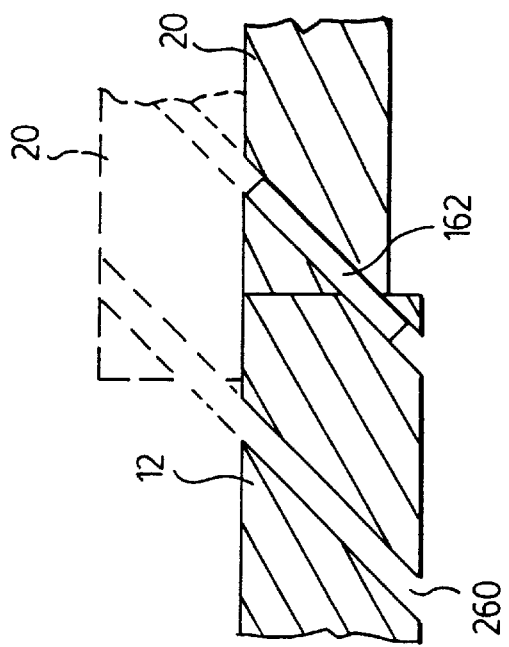

EXTENDABLE TRAILER

SCOPE OF THE INVENTION

This invention relates to trailers and tailgates and, more particularly, to trailers which are extendable.

BACKGROUND OF THE INVENTION

Trailers are known as adapted to be towed behind vehicles such as automobiles, vans and trucks as on road or off road for carrying loads. Known trailers suffer the disadvantage that they have a fixed size and/or configuration which limits the nature of the loads which can be carried. Most known trailers and the beds of vehicles suffer the disadvantage that since they have a fixed bed size, loads which are, for example, longer than the fixed bed can only be carried by the end of the load extending unsupported from the bed.

Known tailgates which close the beds of trailers, pickup trucks, vans, station wagons and the like suffer the disadvantage that if they are mounted in a hinge relation, they are relatively expensive and/or may not permit location as a horizontal extension of the bed.

SUMMARY OF THE INVENTION

To at least partially overcome these disadvantages of known devices, the present invention provides a tailgate for a vehicle having a load bed, particularly a trailer, which tailgate is removably mountable either as an upstanding wall or an extension of the bed.

An object of the present invention is to provide an extendable trailer.

Another object is to provide a mechanism for extension of a vehicle's load carrying bed.

Another object is to provide an inexpensive tailgate for pickup trucks, vans, station wagons and the like which can, in one position, partially close an edge of a bed of the vehicle and, in another position, extend the bed of the vehicle.

Another object is to provide a construction for a knock-down trailer which can be readily assembled into different configurations.

Another object is to provide a removable tailgate for a trailer which can be manually moved, between a wall-forming position and a bed extending position without the need for tools.

Another object is to provide a removable supplemental load support surface for a vehicle which can be manually moved between a horizontal support position and a verticle storage position.

In one aspect, the present invention provides an extendable trailer comprising:

a bed supported on a wheel assembly;

at least one gate member removably coupled to a side edge of the bed by means of at least one plug and socket device;

the plug and socket device comprising:

a rod extending away from a side edge of the gate member directed away from the side edge of the gate inclined at a first angle to a plane of the gate member and a socket provided on the side edge of the bed directed away from the bed inclined at an second angle to a plane of the bed and adapted to slidably and removably receive and lock the rod coaxially therein such that, in a first configuration of the gate member relative the bed the gate member extends upwardly substantially perpendicular from the side edge of the bed defining a wall, and in a second configuration of the gate member relative the bed, the gate member extends laterally substantially parallel from the bed defining a side extension to the bed.

In another aspect, the present invention provides an extendable trailer comprising:

a bed carrying underneath thereof a wheel assembly;

at least four side panels each connected to a side edge of the bed defining a box;

at least one of the side panels being removably connected to the bed, either in a first relative position or in a second relative position by means of at least one coupling device comprising:

a first female member provided on a side edge of the panel at a first angle to a plane of the panel;

a second female member provided on the side edge of the bed at a second angle to a plane of the bed;

an elongate rigid male member having a first male end adapted to be slidably and removably secured in the first female member and a second male end adapted to be slidably and removably secured in the second female member;

the first male end and the second male end extending away at a third angle to each other;

the first, second and third angles being such that in the first position the panel forms a perpendicular wall to the bed and in the second position the panel forms a parallel extension to the bed at the side edge thereof In another aspect, the present invention provides a motor vehicle having a load carrying bed open along an edge of the carrier bed, a removable gate connected to the edge of the carrier bed by means of at least one coupling device comprising a rod extending away from the gate directed towards the carrier bed edge inclined at about 45 degrees to a plane of the gate and a socket provided on the carrier bed edge directed away from the rod inclined at about 45 degrees to a plane of the bed and adapted to slidably and removably receive and lock the rod coaxially therein in a first configuration of the gate relative the bed in which the gate extends upwardly substantially perpendicular from the bed edge and with the gate manually removable from the bed for rotation of the gate 180 degrees about an axis of the rod and re-insertion of the rod into the socket in a second configuration of the gate relative the bed in which the gate extends laterally substantially parallel from the bed defining a side extension to the bed.

In another aspect, the present invention provides a vehicle having a load carrying bed with a side edge of the bed, a gate manually removably coupling to the bed in a first wall-forming orientation in which the gate extends upwardly from the side edge of the bed providing an upstanding wall to the bed, and in a second bed extending orientation in which the gate extends laterally from the side edge of the bed providing a side extension to the bed, the gate removably coupling to the bed by a socket-and-plug coupling mechanism comprising:

a female socket member having a socket extending about a linear socket axis, a male member having a plug extending about a linear plug axis, the plug slidable into and out of the socket for securing the male member within the female member with the plug axis coaxial the socket axis and for removal therefrom, the plug coaxially slidable into the socket in a first and a second rotational positions of the plug relative the socket, each of the first and second rotational position being a position in which the plug is orientated, rotated 180 degrees about the plug axis relative the other of the first and second positions, the female socket member fixed to the bed member proximate the side edge with the socket axis at an angle of about 45 degrees to the bed angled upwardly and away from the side, the male member coupled to the gate proximate an edge of the gate with the plug to extend away from the gate at an angle of 45 degrees to the gate;

wherein with said plug in said first rotational position of the plug in the socket, the gate in said first wall-forming orientation position and with the plug in said second rotational orientation of the gate in the socket the gate is in said second bed extending orientation.

A manually removable tailgate for a trailer which is to be coupled to the trailer either in a wall-forming configuration or a bed extending configuration. The tailgate is coupled to the trailer bed by a plug-in-socket sliding arrangement with, upon removal, relative rotation of the plug and/or the entire gate 180 degrees about an axis of the socket permitting movement from one orientation to the other.

BRIEF DESCRIPTION OF THE DRAWINGS

Further aspects and advantages of the invention will become apparent from the following description taken together with the accompanying drawings in which:

FIG. 4 is an enlarged schematic view of a corner of the trailer of FIG. 1 showing a mechanism coupling a removable gate of the trailer to the trailer bed in a wall-forming configuration;

FIG. 5 is a longitudinal cross-sectional side view along the longitudinal frame member of FIG. 4 showing the construction of a socket therein;

FIG. 6 is a schematic side view of the removable gate and trailer bed of FIG. 2 in a wall-forming configuration;

FIG. 7 is a schematic side view similar to that in FIG. 6 but showing the removable gate and trailer bed of FIG. 2 in a bed extending configuration;

FIG. 8 is a schematic side view of the trailer of FIG. 1 in the same configuration as shown in FIG. 1;

FIG. 9 is a schematic side view of the trailer of FIG. 1 identical to FIG. 8, however, with each of the trailer tongue, wheel assembly and front and rear gates in an extended configuration;

FIG. 10 is a schematic side view of the trailer of FIG. 1 in a configuration similar to that shown in FIG. 9 but with the trailer pivoted about the trailer tongue;

FIGS. 18, 19 and 20 are schematic cross-sectional side views of a fifth embodiment of a socket and plug coupling mechanism in accordance with the present invention in a wall-forming configuration, wall-forming and bed extending configurations, respectively.

DETAILED DESCRIPTION OF THE DRAWINGS

Figure 1:
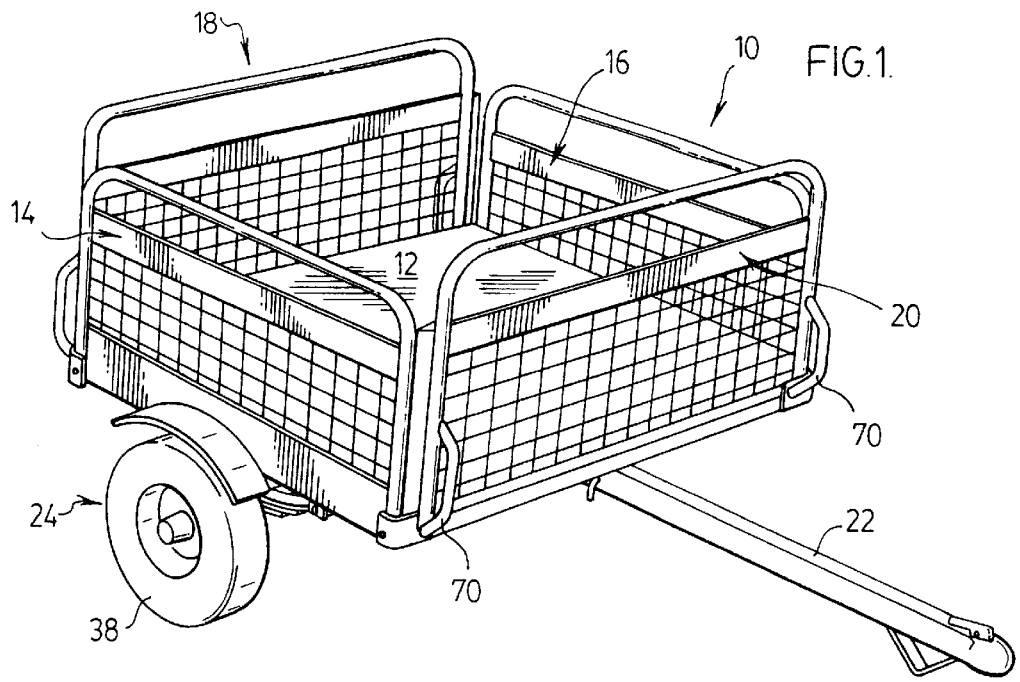
FIG. 1 is a perspective view of a trailer in accordance with a first embodiment of the present invention with removable gates in wall-forming configurations.
Figure 2:
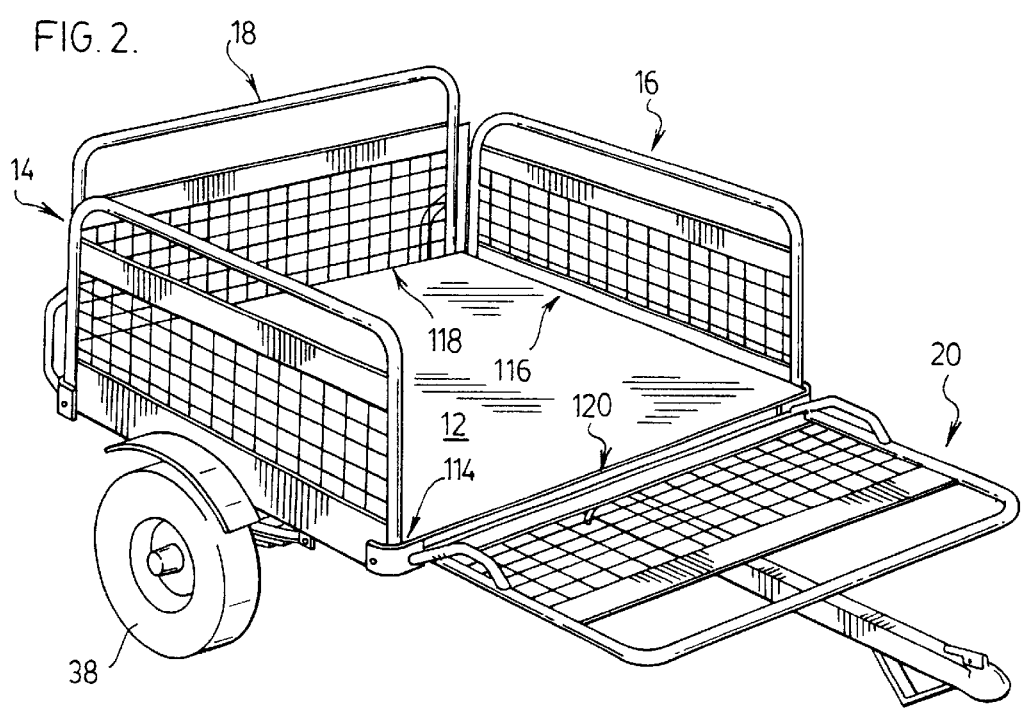
FIG. 2 is a perspective view of the trailer of FIG. 1 with the removable front gate in a bed extending configuration.

Reference is made to FIGS. 1 and 2 which show a trailer 10 having a load carrying bed 12 surrounded by two upstanding side panels 14 and 16, a rear gate 18 and a front gate 20. A trailer 10 includes a tongue 22 and a pair of wheel assemblies 24 and 26 carrying road engaging wheels 38 and 40.

The front gate 20 is removably secured to the bed 12 for manual removal and recoupling such that the front gate 20 may assume either the wall-forming orientation shown in FIG. 1 or the bed extending orientation shown in FIG. 2.

Figure 3:
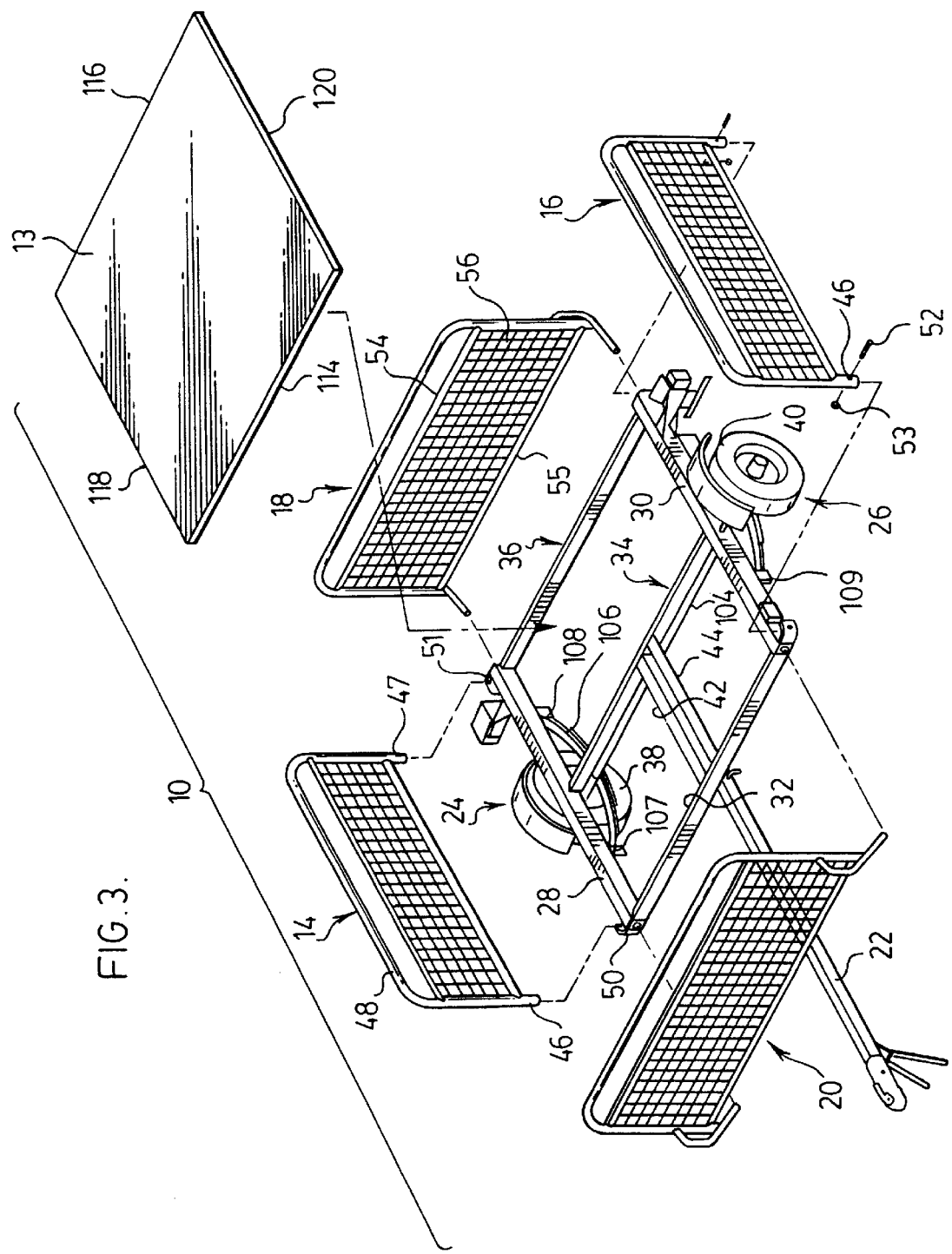
FIG. 3 is a pictorial exploded view of the trailer of FIG. 1.

FIG. 3 shows an exploded view of the component of the trailer 10 shown in FIG. 1. The trailer bed 12 comprises a deck 13 of a sheet of material such as plywood and a framework of longitudinal frame members 28 and 30 with transverse frame members 32, 34 and 36 to support the deck 13. A pair of short longitudinally extending tongue supporting frame members 42 and 44 extend longitudinally between the transverse frame members 32 and 34 spaced apart to receive an inner end of the tongue 22 therebetween. Wheel assemblies 24 and 26 are shown to be removably mounted to the respective longitudinal frame members 28 and 30.

Each of the side panels 14 and 16 are removably secured to the bed of the trailer by a downwardly extending ends 46 and 47 of tube 48 extending downwardly into socket-like receptacles 50 and 51 provided on the longitudinal frame members 28 and 30. The ends 46 and 47 are fixedly secured in the receptacles 50 and 51 as by fasteners comprising a bolt 52 and a nut 53.

Each of the side panels 14 and 16 and the rear gate 18 and front gate 20 are illustrated as being of a preferred construction with a peripheral metal tube 48 bent into a U shape and with two cross members 54 and 55 extending between the arms of the U shape. A mesh 56 is provided secured to fill the interior between the tube 48 and the cross members 54 and 55. Each of the side panels and front and rear gates therefor comprise a substantially planar rectangular member. As seen, the bed 12 is provided as a substantially planar member which has four side edges with each of the side panels 14 and 16 and rear and front gates 18 and 20 extending upwardly from a respective side edge 114, 116, 118 and 120 of the bed 12.

Reference is made to FIG. 5 which shows an exploded pictorial view of a socket and plug coupling mechanism preferably used for removably coupling the front gate 20 to the bed 12 in the two positions shown in FIGS. 1 and 2. The socket and plug coupling mechanism includes a pair of female sockets 60 provided in the bed 12. One of these sockets 60 is shown in FIG. 4 as provided as an open ended cylindrical socket provided within the end of the longitudinal frame member 28. FIG. 5 shows a longitudinal cross-section along the socket 60 in FIG. 4 showing the socket 60 with a linear axis 62 of the socket being disposed at an angle 64 relative to the plane of the bed 12 indicated as 66.

The socket and plug coupling mechanism also includes male members 70 secured to the front gate 20 at each of its sides. The male member 70 comprises a tube 71 bent into a generally C shape having a first arm portion 72, a central bight portion 73 and a second arm portion 74. A first end 76 of the arm 72 is secured to the tube 48 spaced from a lower edge 78 of the front gate 20. The second arm portion 74 is secured intermediate its length to the end of the tube 48 such that the male member 70 provides a plug 80 which extends from a first side 82 of the gate 20 away from the gate as shown. On a second side of the gate 83 opposite the first side, the male member 70 provides the remainder of the second arm portion 74, the bight portion 73 and the first arm portion 71 as a handle-like structure advantageous for manual grasping by a user. Securing the tube 71 comprising the male member to the tube 48 at two separate locations provides rigidity and structural integrity to the combined structure.

The plug 80 is disposed about a linear plug axis 86. The plug 80 is adapted to coaxially slide into the socket 60.

FIG. 6 illustrates in solid lines the front gate 20 and the bed 12 coupled together in a wall-forming orientation with the plug 80 fully received within the female socket 60 as shown in solid lines in FIG. 6. As indicated by the arrow 88, the front gate 20 may be moved manually by sliding of the front gate keeping the plug axis 86 coaxially aligned with the socket axis 62 to remove the front gate 20 and slide it into a removed position as, for example, shown in dashed lines in FIG. 6. From the position shown in dashed lines in FIG. 6, the front gate may be manipulated such that it is effectively rotated to the position shown in dashed lines in FIG. 7 and, hence, slid manually in the direction indicated by arrow 89 to insert the plug 80 into the socket 60 as shown in solid lines in FIG. 7 in which the front gate 20 is in a bed extending orientation.

It is to be appreciated that in accordance with the preferred embodiment shown, there are two plugs 80 spaced along the lower edge 78 of the front gate 20 and two complementary sockets 60 spaced along the side edge 120 of the bed 12. In rotating the front gate 20 from the position shown in dashed lines in FIG. 6 to the position shown in dashed lines in FIG. 7, the gate 20 is moved from a first rotational position shown in dashed lines in FIG. 6 to a second rotational position shown in dashed lines in FIG. 7. The first and second rotational positions represent positions in which each is rotated 180 degrees relative the plug axis 86. In such rotation, it is to be appreciated that one of the plugs 80 which is on the left hand side of the bed 12 before rotation becomes moved to the right hand side of the bed after rotation.

As seen in FIG. 6, the plug axis 86 forms an angle 90 with a plane indicated 92 of the front gate 20.

In the preferred embodiment, the plug angle 90 is 45 degrees and, as well, the socket angle 64 is 45 degrees. As a result, in FIG. 6, the angle 96 between the plane 66 of the bed and the plane 92 of the gate is 90 degrees whereas in FIG. 7, the angle between the plane of the bed and the plane of the gate is 180 degrees, that is, the front gate 20 extends forward parallel the plane of the bed 12. As well, as seen in FIG. 7, the upper surface 98 of the bed deck and the surface of the second side 83 of the front gate 20 are disposed in the same plane.

By reason of the fact that the plug 80 extends downwardly into the female socket 60, it is not necessary that there be any means to fixedly secure the plug 80 within the socket 60. Effectively, due to gravity and due to the relatively close receipt of the plug 80 within the socket 60, the plug 80 is not inclined to become disengaged from the plug 60 in normal use of the trailer. This is particularly so in the wall-forming configuration of FIG. 6 with the weight of the front gate 20 substantially above the socket 60 intending to urge the plug 80 downwardly into the socket. In the bed extending configuration of FIG. 7, the weight of the front gate 20 cantilevering the plug 80 within the socket 60 tends to produce frictional forces resisting withdrawal of the plug 80.

Nevertheless, mechanical devices can be provided so as to lock the plug 80 within the socket 60. One preferred configuration is to provide bores which extend transversely through the plug 80 and the socket 60 and can receive a locking pin. Such bores are illustrated in FIG. 4 as 100 in the socket 60 and 101 through the plug 80, adapted for receipt of a pin indicated as 102.

The preferred embodiment illustrated shows the front gate 20 and rear gate 18 being identical and each adapted for coupling and uncoupling with the same socket and plug coupling mechanisms. It is to be appreciated that either one or both of the front and rear gates may be coupled in this manner. The side panels 14 and 16 are merely shown to be held on the bed in a vertical orientation. It is to be appreciated, however, that a similar plug and socket coupling arrangement could be provided such that each of the side panels 14 and 16 could be removably coupled for location either in a wall-forming orientation or a bed extending orientation having, however, regard to the height that the side panels can assume having regard to the location and relative height of the wheel assemblies adjacent the side edges 114 and 116.

Figure 11:
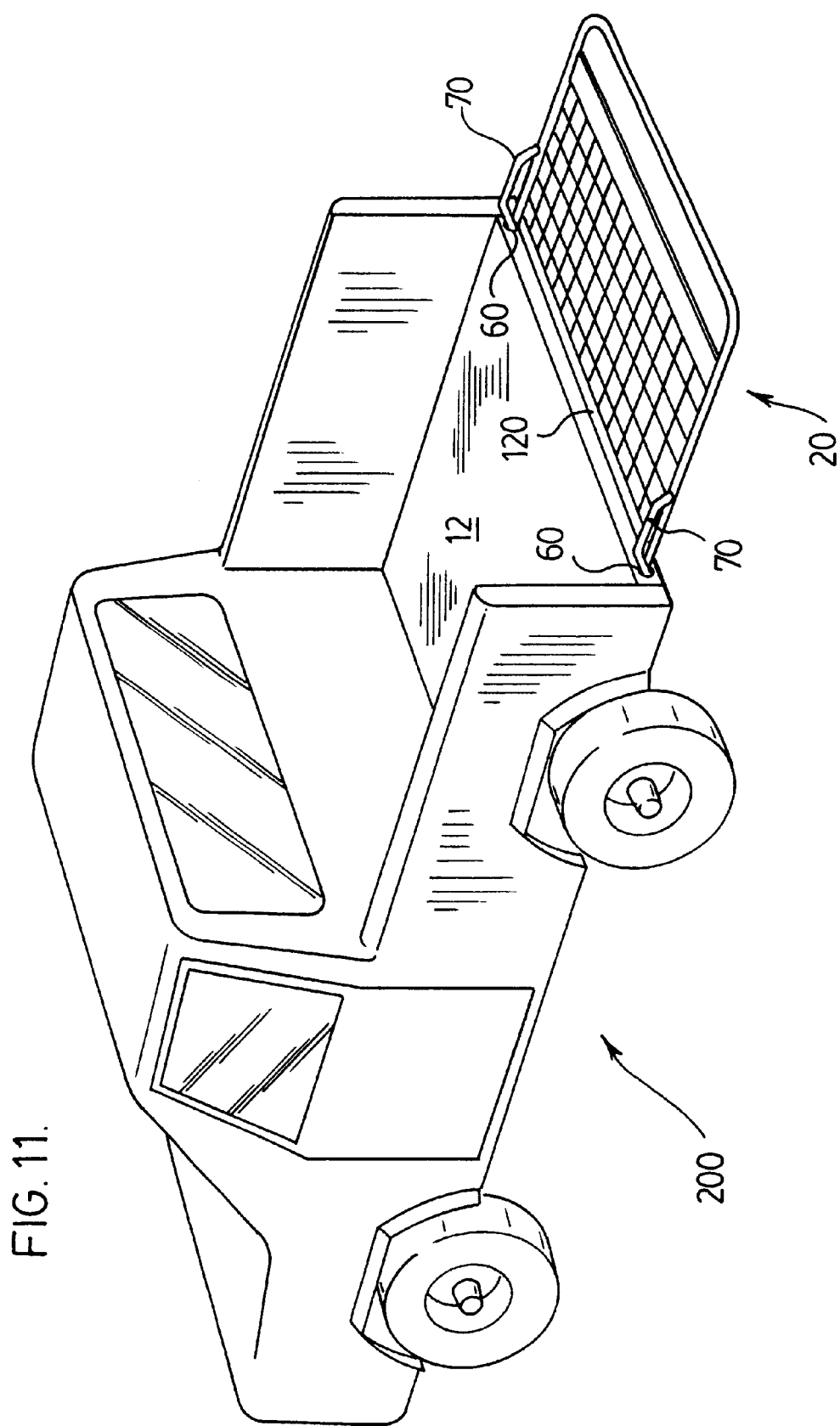
FIG. 11 is a schematic pictorial view of a tailgate in accordance with the present invention coupled to a pickup truck in a manner to extend the bed.

Reference is made to FIG. 11 which shows a gate 20 identical to the front gate 20 of FIGS. 1 to 7, however, as coupled in a bent extending orientation to a rearwardmost side edge 120 of the bed 12 of a pickup truck 200. The bed of the truck is provided with sockets 60 identical to the female socket 60 adjacent the side edge 120 of the pickup truck bed 12. It is to be appreciated that the gate 20 shown in FIG. 11 can be moved from the bed extending position shown in FIG. 11 to an upstanding wall-forming portion as in the manner that the gate 20 does in accordance with the trailer shown in FIGS. 1 and 2.

While FIG. 11 shows the gate 20 as provided in the manner of a tailgate on the rear of the bed of a pickup truck, it is to be appreciated that similar such gates could be utilized to provide walls and/or bed extensions along the sides of the bed of a flat bed truck. Similarly, in the context of other vehicles such as vans which have a bed opening to a rear door as, for example, with the rear door hinged at its top to the rear of the van, such a gate could be coupled for use to either extend the bed of the van with the door open or to provide an upstanding wall with the rear door of the van open or partially open. With automobiles which may have a bed which opens at the rear of an automobile, a similar gate 20 could similarly be used as may be adaptable for some vehicles having an hatchback or the like.

On the side of vehicles, a similar gate could be provided, for example, to provide either a load supporting step or a removable step which could be of assistance in providing a step for passengers to mount into the vehicle. The step could be stored in an upright position or moved to an extending position when to be used as a step.

In addition, in a van with a rearward door or an automobile with a rear trunk with the door or trunk closed, the gate 20 could provide a rearward extension to provide for load bearing capability outside the van or automobile to provide a carrier to the rear of the van or other vehicle even though the van door or trunk may be closed. The location of the gate on the van could be provided such that with materials removed from the gate, the door of the van could nevertheless close. A gate could be removably coupled to the rear bumper of an automobile and provide, for example, a platform extending horizontally towards the rear from the vehicle as a platform useful to carry bicycles, coolers and other devices which may not conveniently fit within the vehicle. The gate could be stored in an upwardly extending position or, if there is adequate height, a downward extending position.

In the preferred embodiment, the front gate 20 is shown as coupled to the bed by two socket and plug mechanisms. It is to be appreciated that a single socket and plug mechanism might be utilized, for example, with the single socket and plug being provided in the center of the gate. Where the plug and socket each have a keying cross-section as, for example, with a keyway or being square or polygonal in shape, then the keying of the plug in the socket could provide for stability against rotation of the gate relative the socket about the plug axis.

Reference is now made to FIGS. 8 to 10 which particularly illustrate additional features of the trailer having an extendable tongue 22, movable wheel assemblies 24 and 26 and of the trailer being tiltable about the tongue 22.

Each wheel assembly 24 and 26 is connected together by a stabilizing axle 104 preferably with the axle 104 being removably coupled to each of the wheels 38 and 40. The wheel assembly 24 comprises a wheel 38 rotatably supported on a hub with the hub carrying a supporting leaf spring 106 and a wheel cover. The leaf spring 106 has two ends 107 and 108 each adapted to be secured by pinning to respective coupling brackets 109 and 110 secured to the underside of longitudinal frame member 28. As seen, there is a first forward set of coupling members 109 and 110 provided on the frame member 28 and a second, rearward set of coupling members 111 and 112. By use of the removable pins, the ends 107 and 108 of the spring can be coupled in a forward position to members 109 and 110 or in a rearward position to members 111 and 112. The wheel assembly can thus be moved and secured to the bed 12 at a forward position or a rear position. Movement of the wheel assembly to one, two or more positions along the longitudinal length of the trailer is advantageous to provide for optimal load carrying ability having regard to the relative placement of the loads in the trailer and the effective length of the trailer bed comprising both the bed 12 and front or rear gates which may be in the bed extending configurations.

Referring to FIG. 8, the transverse frame members 42 and 44 have three spaced bores therethrough to pin the tongue 22 thereto by the use of a pair of pins 113 and 114. Each pin is to extend through a bore in members 42, through a bore in tongue 22 and through a bore in member 44. The tongue 22 has two bores spaced a fixed distance. Members 42 and 44 have three bores each spaced from each other this same fixed distance.

The tongue 22 is fixed to the bed 12 in a retracted position as shown in FIG. 8 by reason of pins 113 passing through the rearmost bore 115 in the members 42 and 44 and pin 114 passing through the middle bore 117 in the members 42 and 44. In the extended position as shown in FIG. 9, pin 113 passes through the middle bore in members 42 and 44 and pin 114 passes through forwardmost bore 116.

FIG. 10 shows a configuration with pin 114 removed and the tongue and bed are pivoted relative to the other about the remaining pin 113 as is advantageous to permit tilting of the trailer. FIG. 10 shows an orientation with the trailer tilted about the tongue 22 and, as well, with the rear gate 18 in a bed extending position as is advantageous to permit rolling of wheel barrow or other vehicle up the rear gate 18 onto the remainder of the bed as may be particularly preferred although, not shown, with the tongue 22 secured to a vehicle.

A preferred embodiment of the socket and plug coupling mechanism is shown in FIGS. 6 and 7 in which a plug is fixedly secured to the gate and upon rotation of the plug with the gate can be adapted to be reinserted into the socket carried by the bed. It is to be appreciated that the plug could be provided permanently on the bed as, for example, to extend upwardly and rearwardly from the bed and that a suitable socket could be provided on the gate.

Various other arrangements can be adopted, however, without departing from the spirit of this invention. For example, each of the bed and gate may be provided with a socket and a separate removable plug member may be provided having one plug portion to extend into the socket on the bed and the other plug portion to extend into the socket on the gate. Such an arrangements are shown in FIGS. 12 to 20.

Figure 12:
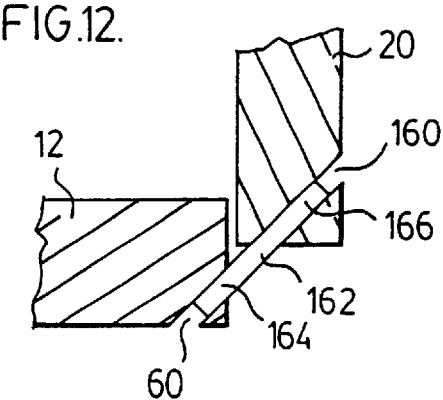
FIGS. 12 and 13 are schematic cross-sectional side views of a second embodiment of a socket and plug coupling mechanism in accordance with the present invention in a wall-forming configuration and bed extending configuration, respectively.

As seen in FIG. 12, a bed 12 carries a socket 60. A gate 20 carries a socket 160. A pin 162, which is shown in FIGS. 12 and 13 as a straight linear member, has a bed plug portion 164 received in the socket 60 of the bed and a gate socket portion 166 received in the socket of the gate.

Figure 13:
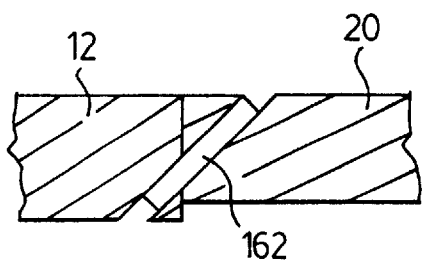

By slidably removing the gate 20 and rotating it 180 degrees about the axis of its socket 160, the gate 20 can then be located in the bed extending position of FIG. 13 with the pin 162 to again secure the gate 20 to the bed 12. It is to be appreciated that the pin 162 may be provided as a separate removable member. Alternatively, it can be permanently secured to the gate 20 as is the case with the first embodiment. Alternatively, it could be removably secured to the bed 12.

Figure 14:
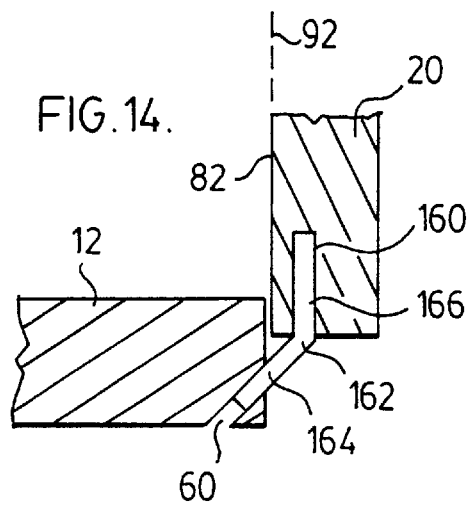
FIGS. 14 and 15 are schematic cross-sectional side views of a third embodiment of a socket and plug coupling mechanism in accordance with the present invention in a wall-forming configuration and bed extending configuration, respectively.
Figure 15:
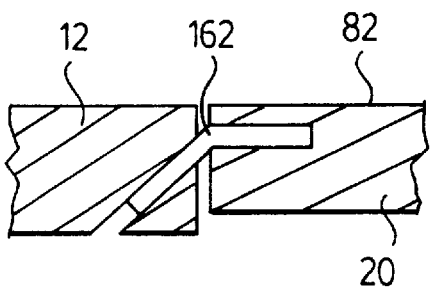

FIGS. 14 and 15 show an embodiment similar to that in FIGS. 12 and 13 in which a pin 162 connects the bed 12 and gate 20 in the gate-forming orientation of FIG. 14 or the bed extending configuration of FIG. 15 with separate plug portions of the pin 162 to be received within a socket 60 in the bed 12 or a socket 160 of the gate 20. However, in FIGS. 14 and 15, the pin 162 has its bed plug portion 164 disposed at an angle of 135 degrees to its gate plug portion 166 and the socket 160 in the gate portion is disposed with its axis parallel the plane 92 of the gate 20. In the arrangement of FIGS. 14 and 15, the pin 162 can be separately removable from both the bed or the gate or, alternatively, the pin 162 could be maintained coupled to either one of the bed or the gate. When the trailer is in use, particularly in the position shown in FIG. 15, it is preferred that at least the gate plug portion 160 is fixedly secured to the gate 20 as, for example, by a separate pin arrangement. One advantage of the configuration shown in FIGS. 14 and 15 is that in that it is merely the pin 162 which is rotated 180 degrees about the axis of the bed plug portion 164 to permit movement between the configurations of FIGS. 14 and 15, and a side of the gate indicated as first side 82 can be directed inwardly towards the trailer as seen in FIG. 14 and can also comprise the upper load supporting surface as seen in FIG. 15. In contrast, in the context of the embodiment shown in FIGS. 6 and 7, in FIG. 7, the surface which provides the support surface of the gate for a load is not the surface which is directed inwardly towards the trailer in FIG. 6.

Figure 16:
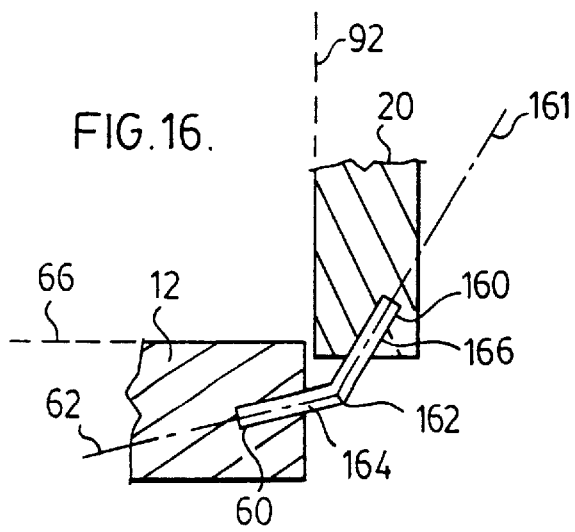
FIGS. 16 and 17 are schematic cross-sectional side views of a fourth embodiment of a socket and plug coupling mechanism in accordance with the present invention in a wall-forming configuration and bed extending configuration, respectively.
Figure 17:
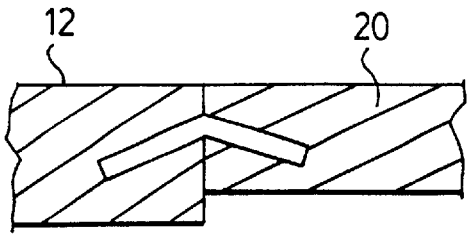

Reference is made to FIGS. 16 and 17 which show an embodiment with a separate removable pin 162 adapted to have its ends received in the sockets in each of the bed 12 and frame 20. In FIGS. 16 and 17, the axis 62 of the bed socket 60 is disposed at an angle of 22.5 degrees to the plane 66 of the bed. The socket 160 has its axis 161 disposed at an angle of 22.5 degrees to the plane 92 of the gate. The pin 162 has its bed plug portion 164 disposed at an angle of 135 degrees to the gate plug portion 166. In order to change from the wall-forming configuration of FIG. 16 to the bed extending configuration of FIG. 17, both the pin 162 and the gate 20 must effectively be rotated. That is, the pin 162 must be removed from both sockets 60 and 100 and rotated 180 degrees about the axis of its bed plug portion. As well, the gate 20 must be removed from the pin 162 and also rotated 180 degrees about the axis of its socket 160.

Reference is made to FIGS. 18, 19 and 20 which show an embodiment identical to that of FIGS. 12 and 13, however, with bed 12 carrying a second socket 260 such that, as shown in FIG. 18, the gate 20 may extend in one wall-forming configuration directly above the bed 12. The socket 260 opens from the upper surface of the bed inward from side edge 120. In contrast, the socket 60 opens from the side surface of the bed below side edge 120. The pin 162 can be used to secure the gate 20 to the bed in either socket 60 as in FIG. 19 and in FIG. 20 in solid lines, or socket 260 as seen in FIG. 18 in solid lines and in FIG. 20 in dashed lines. FIGS. 18, 19 and 20 show bed 12 with two sockets 60 and 260. Additional sockets could be provided in the bed 12, for example, to locate gate 20 inwardly from the side edge 120. Similarly, the gate 20 could be provided with a plurality of sockets. In an orientation as seen in dashed lines in FIG. 20, two sockets could be provided in each of the bed 12 and gate 20 to receive two pins.

In the preferred embodiments, the gate 20 is shown to extend perpendicular to the bed 20 or parallel thereto. This is not necessary and for many situations, it may be satisfactory and advantageous to have the gate extend upwardly at an angle different than perpendicular to the bed or parallel to the bed.

The preferred embodiments particularly illustrated have shown the socket and plug arrangements with angles selected which are multiples of 22.5 degrees developing 180 degree rotational positions extending at 90 degrees relative each other. It is to be appreciated that different angles could be selected for the relative orientations of the sockets and/or plugs to provide a desired generally upstanding gate in a wall-forming configuration and a general bed extension in a bed extending configuration.

Similarly, the relative exit points of the sockets on the bed and/or the gate can determine whether the gate may be provided to the rear of the bed or merely above the bed without being to the rear of the bed as in the wall-forming configuration. The relative location of the edge of the bed and the edge of the gate in the wall-forming configuration and bed extending configurations can be selected having regard to the desired particular use of the gate.

I claim:

1. An extendable trailer comprising:
   a bed supported on a wheel assembly;
   at least one gate member removably coupled to a side edge of the bed by means of at least one plug and socket device;
   the plug and socket device comprising:
   a rod extending away from a side edge of the gate member directed away from the side edge of the gate inclined at a first angle to a plane of the gate member and a socket provided on the side edge of the bed directed away from the bed inclined at an second angle to a plane of the bed and adapted to slidably and removably receive and lock the rod coaxially therein such that, in a first configuration of the gate member relative the bed, the gate member extends upwardly substantially perpendicular from the side edge of the bed defining a wall, and in a second configuration of the gate member relative the bed, the gate member extends laterally substantially parallel from the bed defining a side extension to the bed.

2. A trailer as claimed in claim 1 wherein the gate member is movable between the first configuration and the second configuration by pulling the gate member away from the bed to slide the rod out of the socket, rotating the gate member 180 degrees relative the rod and bringing the gate member towards the bed to slide the rod into the socket.

3. A trailer as claimed in claim 1 wherein each of the first angle and the second angle is about 45 degrees.

4. A trailer as claimed in claim 1 wherein the rod and the socket are integrally formed with the gate member and the bed, respectively, the socket is open at both ends thereof and free end of the rod extends out through the socket.

5. A trailer as claimed in claim 1 wherein the gate member is coupled to the bed with at least two of said plug and socket devices spaced apart along the side edge of the bed.

6. A trailer as claimed in claim 1 including a removable locking member to securely lock the rod within the socket and prevent sliding of the rod out of the socket.

7. A trailer as claimed in claim 6 wherein the locking member comprises a pin engaging with the rod and the socket.

8. A trailer as claimed in claim 1 wherein the rod and the socket have complementary cross-sectioned shapes.

9. A trailer as claimed in claim 1 wherein the rod is secured to the gate member at two spaced locations.

10. A trailer as claimed in claim 1 wherein the wheel assembly is removably secured to the bed for mounting at at least two longitudinally located spaced positions underneath the bed.

11. A trailer as claimed in claim 1 wherein the bed carries a draw tongue at an underside thereof to connect the trailer to a motor vehicle.

12. A trailer as claimed in claim 11 wherein an end of the draw tongue is pivotally connected to the bed underneath to enable the bed to be tilted relative the draw tongue.

13. A trailer as claimed in claim 11 wherein the draw tongue is longitudinally extendable and retractable to vary the length the tongue extends forwardly of the trailer and includes a locking mechanism to lock the drawbar to the trailer with the tongue extended forwardly different lengths.

14. An extendable trailer comprising:
    a bed carrying underneath thereof a wheel assembly;
    at least four side panels each connected to a side edge of the bed defining a box;
    at least one of the side panels being removably connected to the bed, either in a first relative position or in a second relative position by means of at least one coupling device comprising:

a first female member provided on a side edge of the panel at a first angle to a plane of the panel;

a second female member provided on the side edge of the bed at a second angle to a plane of the bed;

an elongate rigid male member having a first male end adapted to be slidably and removably secured in the first female member and a second male end adapted to be slidably and removably secured in the second female member;

the first male end and the second male end extending away at a third angle to each other;

the first, second and third angles being such that in the first position the panel forms a perpendicular wall to the bed and in the second position the panel forms a parallel extension to the bed at the side edge thereof.

15. A trailer as claimed in claim 14 wherein the angle between the first and second male ends is 180 degrees to define a coaxial extension to each other and each of the first and second angles is about 45 degrees.

16. A trailer as claimed in claim 14 wherein either the first male end or the second male end is integrally joined with either the first or the second female member.

17. A trailer as claimed in claim 14 wherein a panel located at a longitudinal end of the bed defines a front gate and a panel opposite thereto located at opposite ends thereof defines a rear gate and at least one of the gates is connected to the bed by said coupling device.

18. In a motor vehicle having a load carrying bed open along an edge of the carrier bed, a removable gate connected to the edge of the carrier bed by means of at least one coupling device comprising a rod extending away from the gate directed towards the carrier bed edge inclined at about 45 degrees to a plane of the gate and a socket provided on the carrier bed edge directed away from the rod inclined at about 45 degrees to a plane of the bed and adapted to slidably and removably receive and lock the rod coaxially therein in a first configuration of the gate relative the bed in which the gate extends upwardly substantially perpendicular from the bed edge and with the gate manually removable from the bed for rotation of the gate 180 degrees about an axis of the rod and re-insertion of the rod into the socket in a second configuration of the gate relative the bed in which the gate extends laterally substantially parallel from the bed defining a side extension to the bed.

19. In a vehicle having a load carrying bed with a side edge of the bed, a gate manually removably coupling to the bed in a first wall-forming orientation in which the gate extends upwardly from the side edge of the bed providing an upstanding wall to the bed, and in a second bed extending orientation in which the gate extends laterally from the side edge of the bed providing a side extension to the bed, the gate removably coupling to the bed by a socket-and-plug coupling mechanism comprising:

a female socket member having a socket extending about a linear socket axis, a male member having a plug extending about a linear plug axis, the plug slidable into and out of the socket for securing the male member within the female member with the plug axis coaxial the socket axis and for removal therefrom, the plug coaxially slidable into the socket in a first and a second rotational positions of the plug relative the socket, each of the first and second rotational position being a position in which the plug is orientated, rotated 180 degrees about the plug axis relative the other of the first and second positions, the female socket member fixed to the bed member proximate the side edge with the socket axis at an angle of about 45 degrees to the bed angled upwardly and away from the side, the male member coupled to the gate proximate an edge of the gate with the plug to extend away from the gate at an angle of 45 degrees to the gate;

wherein with said plug in said first rotational position of the plug in the socket, the gate in said first wall-forming orientation position and with the plug in said second rotational orientation of the gate in the socket the gate is in said second bed extending orientation.

* * * * *